United States Patent
Koyama et al.

(10) Patent No.: US 6,440,692 B1
(45) Date of Patent: Aug. 27, 2002

(54) METHOD OF TREATING HAIRS OR FEATHERS USING MICROORGANISMS

(75) Inventors: Yoh-ichi Koyama; Koki Suzuki; Koki Ogata; Masashi Kusubata; Shinkichi Irie, all of Tokyo (JP)

(73) Assignee: Japan Institute of Leather Research, Tokyo (JP)

( * ) Notice: Subject to any disclaimer, the term of this patent is extended or adjusted under 35 U.S.C. 154(b) by 0 days.

(21) Appl. No.: 09/553,851

(22) Filed: Apr. 20, 2000

(30) Foreign Application Priority Data

Apr. 20, 1999 (JP) .......................... 11-112363
Nov. 5, 1999 (JP) .......................... 11-315358

(51) Int. Cl.$^7$ .............................. C12P 21/06
(52) U.S. Cl. .............. 435/68.1; 435/265; 435/254.1; 435/220; 435/171; 71/18
(58) Field of Search ................ 435/171, 222, 435/220, 221, 265, 68.1, 254.1; 71/18

(56) References Cited

U.S. PATENT DOCUMENTS 2,988,487 A * 6/1961 Nickerson .................. 435/122
4,159,944 A 7/1979 Erickson et al.

FOREIGN PATENT DOCUMENTS

| DE | 1 090 673 | 10/1960 |
| EP | 0 498 452 | 8/1992 |
| JP | 2 207855 | 8/1990 |

OTHER PUBLICATIONS

EI–Naghy, et al., Mycopathologia (1998), 143(2), 77–84.*
Abdel–Gawad, et al., Microbiol. Res. (1997), 152(2), 181–188.*
EI –Said, et al., Aswan Sci. Technol. Bull. (1996), 17, 219–232.*
Dozie, et al., World J. Microbiol. Biotechnol. (1994), 10(5), 563–7.*
Kornillowicz, T., Acta Mycologica, (1994) vol. 29, No. 2, pp. 169–178.*
Jain et al., Trans Mycol Soc JPN, (1980 (RECD 1981)) 21 (4), 513–517.*
Abstract, Database WPI, RU 2 002 806, Nov. 15, 1993, Ogarkov et al.
Kaul et al., "Keratinolysis by poultry farm soil fungi", *Mycopathologia*, (1997), vol. 139, pp. 137–140.

* cited by examiner

*Primary Examiner*—Irene Marx
(74) *Attorney, Agent, or Firm*—Browdy and Neimark

(57) ABSTRACT

Large amounts of hairs and feathers can be decomposed and refined by treatment in an oxygen-containing gas stream with a fungus that can decompose hairs and feathers. The resulting decomposed and refined hairs and feathers are useful as a fertilizer.

6 Claims, 6 Drawing Sheets

CONTROLS    DECOMPOSED CATTLE HAIRS ADDED

CONTROLS

DECOMPOSED CATTLE HAIRS ADDED

CONTROLS | DECOMPOSED CATTLE HAIRS ADDED

CONTROLS | DECOMPOSED CATTLE HAIRS ADDED

METHOD OF TREATING HAIRS OR FEATHERS USING MICROORGANISMS

BACKGROUND OF THE INVENTION

This invention relates to the technology of decomposing and refining large volumes of hairs and feathers using fungi. The invention also relates to the technology of using as fertilizers the hairs and feathers that have been decomposed and refined by treatment with fungi.

In leather production, hairs must be removed from hides before they are further processed. One of the common unhairing methods is by dissolving hairs in sulfides and lime. Worldwide, at least several tens of thousand tons of hairs are annually treated (see, for example, U.S. Leather Industries Statistics 1995) and the liquid wastes from the unhairing step account for most of the pollutants in the effluent streams from leather production.

To deal with this situation, a so-called "hair saving unhairing process" has recently been commercialized that can remove hairs with a reduced amount of sulfides (see "Development and Research of Non-Chrome Tanning Technologies", A 1995 Report of Projects Commissioned by MITI, published by the Japanese Association of Leather Technology, Mar. 30, 1996). The method is capable of reducing pollutants in effluent streams but, on the other hand, waste hairs that are conventionally solubilized and disposed of are recovered as solids. Since the hair is slightly decomposable, no effective method for treating the waste hairs has been established.

Large amounts of feathers occur in the poultry industry. Most of them are disposed of and some are used as feeds; however, the feeds from waste feathers are too costly to be considered as a commercially feasible utilization of resources.

Both hairs and feathers are fibrous and structurally so rigid that they cannot immediately be used as raw materials. Making powders of hairs and feathers is advantageous for their effective use in various fields. However, dry grinding of hairs and feathers is not capable of imparting the necessary impact to them which are lightweight and soft. In addition, they are so rigid in structure that they cannot be ground without applying strong external forces. Wet grinding methods developed so far include cutting hairs or feathers into suitable lengths and pulverizing them into powder over a prolonged time, or heating them under pressure and thereafter swelling them to become modified and making a powder of them (see, for example, Unexamined Published Japanese Patent Application (kokai) No. 207855/1990 describing an invention entitled "Process for Producing Hair Powders"). However, treating large volumes of hairs and feathers by those conventional methods is too costly and requires too large facilities to be implemented on a commercial scale.

Unexamined Published German Patent Application No. 1,090,673 discloses a method of performing proteolysis on hairs and feathers with Streptomyces fradiae to make them water-soluble. However, this method not only fails to solve the problem of polluted effluent streams from leather production; it is also unsuitable for the purpose of treating hairs and feathers in large volumes.

In short, no technology has yet been established to provide a method by which large waste hairs that result from the hair saving unhairing process and feathers that occur in the poultry industry can be treated conveniently at low cost, with the added capability for making effective use of them.

SUMMARY OF THE INVENTION

An object, therefore, of the invention is to provide a technology capable of high-volume treatment of waste hairs that occur massively in leather production, as well as feathers that derive from the poultry industry. In other words, the invention aims at treating large volumes of hairs and feathers conveniently at low cost and making effective use of the resulting decomposed and refined product.

With a view to attaining the stated objects, the present inventors made intensive studies and found that certain fungal species could grow by feeding on hairs or feathers as a nutrient source and that the hairs or feathers eventually decomposed and became refined to a readily available state. The present invention has been accomplished on the basis of these findings.

Hence, according to its first aspect, the invention provides a method of decomposing and refining hairs or feathers by treating them in an oxygen-containing gas stream with a fungus that is aerobic and can decompose hairs and feathers.

According to its second aspect, the invention provides the product of decomposition and refining of hairs or feathers that is obtained by the method.

The present inventors also found that the thus obtained product of decomposition and refining of hairs or feathers is useful as a fertilizer. Therefore, according to its third aspect, the invention provides a fertilizer containing such product of decomposition and refining of hairs or feathers.

DETAILED DESCRIPTION OF THE INVENTION

Figure 1:
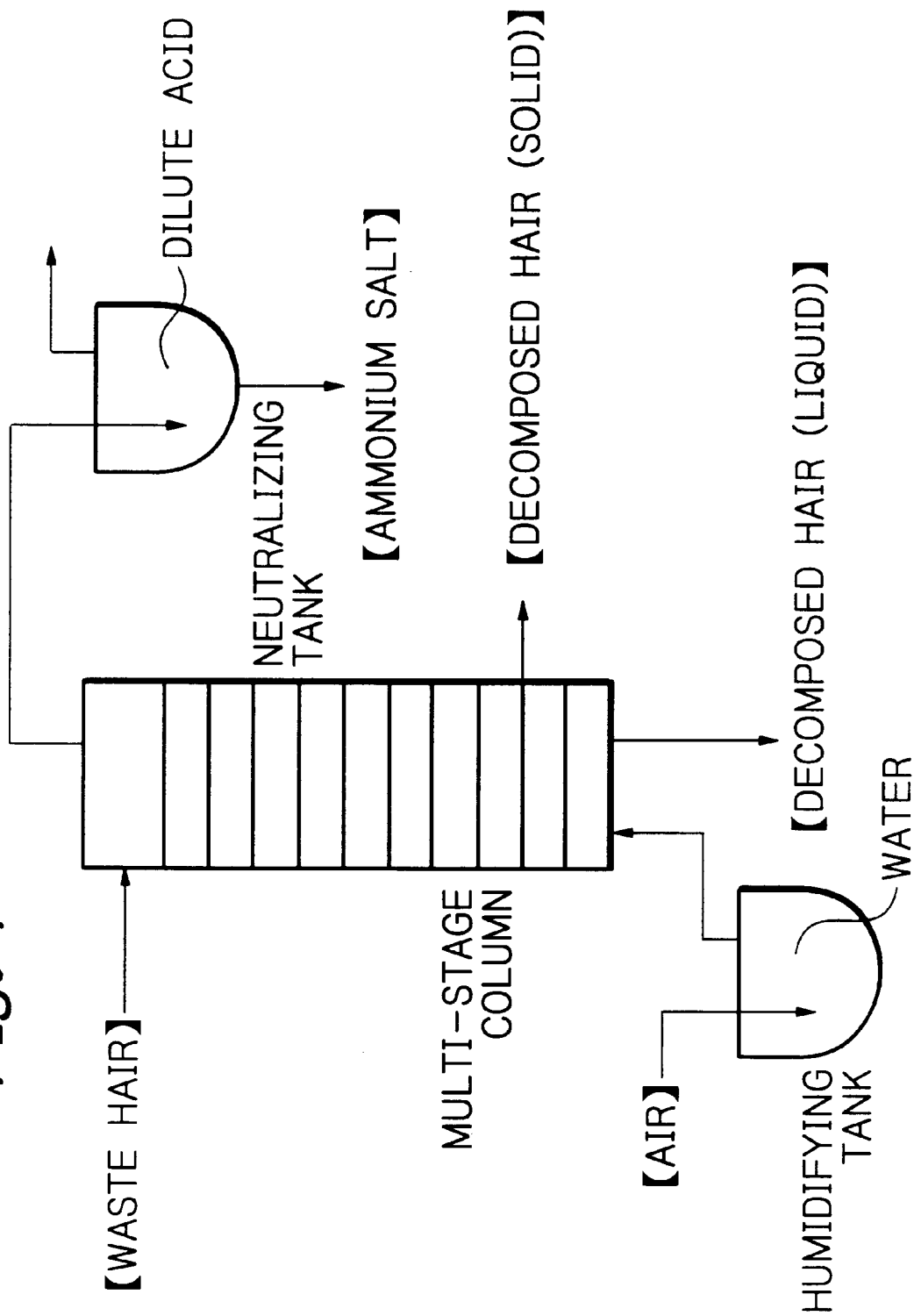
FIG. 1 is a schematic diagram of the process of decomposing hairs or feathers with a fungus in a multi-stage (or multi-tray) packed column.

The present invention is now described below in detail.

Any fungal species can be used in the invention as long as they can fully decompose hairs and feathers. Aerobic fungi are preferred. Exemplary fungi that can be used in the invention include the following: *Acremonium strictum, Arthroderma quadrifidum, A. curreyi, A. tuberculatum, Arthroderm multifidum, A. cuniculi, Aphanoascus terreus, Beauveria bassiana, Cephalosporium acremonium, Chrysosporium asperatum, C. carmichaelii, C. crassitunicatum, C. europae, C. evolceanui, C. georgii, C. inducum, C. inops, C. keratinophilum, C. lobatum, C. lucknowense, C. luteum, C. merdarium, C. multifidum, C. pannicola, C. pannorum, C.*

*parvum, C. pruinosum, C. pseudomerdarium, C. queenslandicum, C. tropicum, C. xerophillum, C. zonatrum, Ctenomyces serratus, Epidermophyton floccosum, Gymnoascus umbrinus, Microsporum audouinii, M. canis, M. cookei, M. gypseum, Scopulariopsis brevicaulis, Scopulariopsis candida, Trichophyton ajelloi, T. mentagrophytes, T. rubrum, T. terrestre, T. vanbreuseghemii,* and *T. verrucosum.* Among these, *C. keratinophilum* is particularly preferred.

The raw materials to be treated by the method of the invention include waste hairs that result from the hair saving unhairing process, as well as feathers that occur in the poultry industry. However, these are not the sole examples and every kind of hairs and bird feathers that originate in other processes and situations can be used as the raw materials.

The method of the invention starts with impregnating hairs or feathers with a liquor containing ingredients that aid in fungal growth, for example, a Y medium containing a yeast extract (see Table 1 below). Thereafter, any of the fungi that can be used in the invention is added to the medium and cultivation is performed for a suitable period.

TABLE 1

| Composition of Y medium | |
|---|---|
| Ingredient | g/L |
| Yeast extract | 1.0 |
| $KH_2PO_4$ | 0.5 |
| $K_2HPO_4$ | 0.5 |
| $MgSO_4$ | 0.2 |
| NaCl | 5.0 |
| PH | 5.0 |

Note that Y medium which is a growth aid may be replaced by any other growth aids such as domestic wastewater and industrial wastewater. Such supplemental media may be omitted if the fungus used can grow without them.

A large amount of ammonia evolves as the decomposition of hairs and feathers progresses. In ordinary culture methods, the evolved ammonia causes a substantial increase in the pH of the culture system and inhibits the growth of the fungus used, eventually causing premature arrest of the hair's or feather's decomposition (i.e., they are not fully decomposed). To deal with this situation, the medium may be washed with water to lower the pH but this is not an industrially feasible method since it requires huge amounts of water, time and cost. If, on the other hand, the reaction system dries up, the fungal growth is inhibited, again arresting the decomposition of hairs and feathers.

As a result of the intensive studies they made in order to solve this problem, the present inventors found that when, with a view to preventing drying of the medium, an oxygen-containing gas such as air was humidified and kept circulated in the cultivation apparatus or when such an oxygen-containing gas was kept in circulation with occasional water spraying, the evolved ammonia was removed as a gas and the pH in the reaction system could be maintained within the range of fungal growth. Take, for example, the fungus *Chrysosporium keratinophilum*; this is a highly aerobic organism and by constant air circulation, its growth is promoted rather than inhibited. Hairs treated by this method are found to have been fully decomposed and can be refined quite easily.

Cultivation is preferably performed at 20–28° C. at a pH of 5–8.5 for a period of about 10–30 days. However, any conditions may be employed as long as a selected fungus can be cultured.

The hairs or feathers that remain after culture have undergone a significant progress of decomposition and can be easily refined not only with an ordinary refining machine but also by manually pressing a spatula or some other suitable means against the hair or feather. The refined hair or feather may be added to soils for assisting in their aggregation; alternatively, they are easily decomposed with soil organisms, insects and small animals to present themselves as a fertilizer. Ammonia that is removed from the reactor may be passed through a dilute acid solution so that it is recovered as an ammonium salt for subsequent use as a nitrogenous fertilizer.

Thus, according to the technology of the present invention for decomposing and refining hairs and feathers, large amounts of waste hairs from leather production and equally large volumes of feathers that occur in the poultry industry, both of which have been a major factor in environmental pollution, can be treated by an environmental friendly approach and the treated product finds effective use in the agricultural field.

EXAMPLES

The following examples are provided for the purpose of further illustrating the present invention but are in no way to be taken as limiting.

Example 1

Decomposing Hairs in Multi-stage Packed Column

Figure 2:
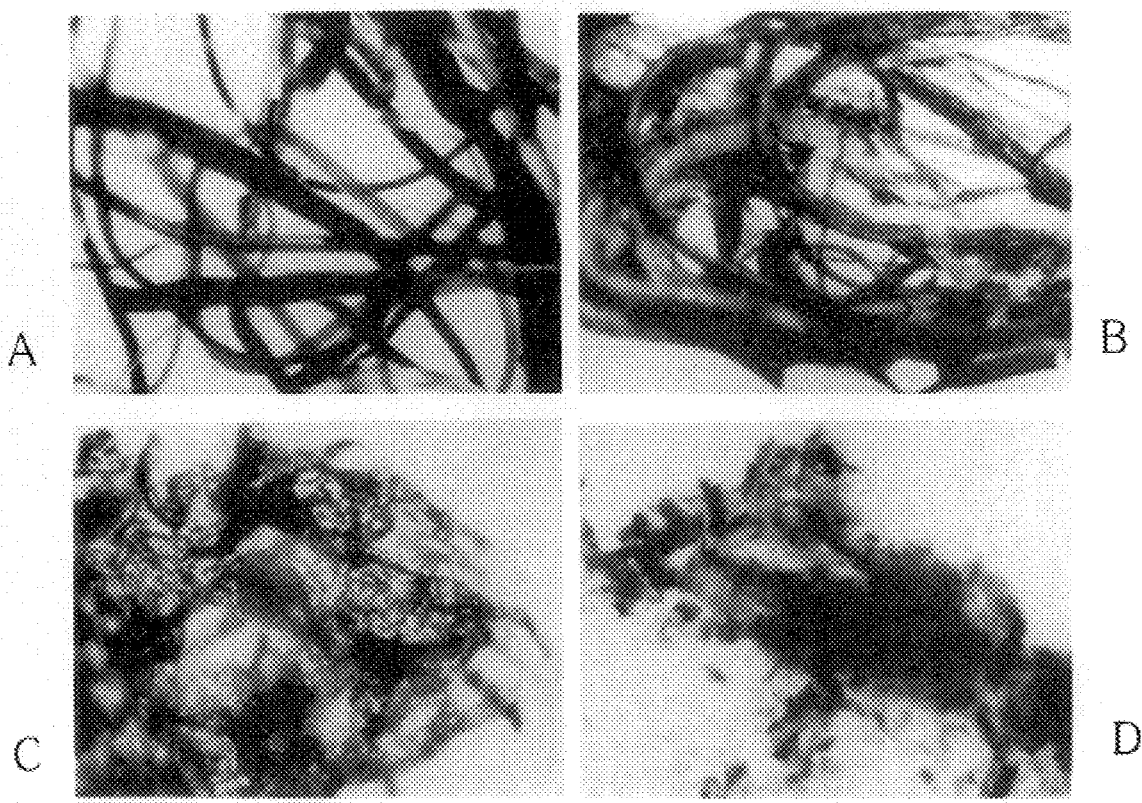
FIG. 2, which contains photographs A, B, C and D shows the progress of decomposition of hairs in the multi-stage packed column.

Cattle hairs were charged into a multi-stage packed column which could receive air from one end and eject it from the other end. The hairs were treated by the hair saving unhairing process and 1 kg of the resulting hairs were impregnated with 4 L of Y medium (see FIG. 1). To the mixture, 100 ml of a seed liquor of *Chrysosporium keratinophilum* (deposited with the National Institute of Bioscience and Human Technology, the Agency of Industrial Science and Technology under Accession Number FERM BP-7099). To prevent the drying of the fungus, humidified air was kept in circulation while the discharged air was directed into dilute acid so that evolving ammonia was removed as a gas from the culture system and recovered in the dilute acid. Instead of circulating humidified air, dry air may be circulated with occasional water spraying. Culture was performed at 20–28° C. at a pH of 5–8.5 for 25–28 days. FIG. 2, which contains photographs A, B, C and D shows the results of the culture: FIG. 2-A shows untreated hairs; FIG. 2-B shows hairs that were cultured with *Chrysosporium keratinophilum* for 8 days; FIG. 2-C shows hairs that were cultured for 25 days; and FIG. 2-D shows hairs that were lightly pressed down with a spatula after 25-day culture. Obviously, the hairs in FIG. 2-D were refined to such an extent that they had no trace of the original shape. The cultured hairs can be readily refined with a common grinder and to human eyes, they no longer retain the shape of hair. Examination under a microscope showed that the hairs had been refined to diameters ranging from several tens of micrometers to several hundred micrometers.

The insolubles that remained after culture for 25 and 28 days were measured for their dry weight and the results are shown in Table 2 below.

TABLE 2

Decomposition of Hair (wt %)

| Run | Microorganism | Days of treatment | Residue (%) | Decomposition (%) |
|---|---|---|---|---|
| 1 | C. keratinophilum | 25 | 46 | 54 |
| 2 | C. keratinophilum | 28 | 39 | 61 |

Obviously, weight losses of about 40–50% occurred as compared with the pre-culture weight.

The nitrogen content data is shown in Table 3.

TABLE 3

Decomposition of hair (N content)

| Organism | Days of treatment | N before treatment | N after treatment | Residue (%) | Decomposition (%) |
|---|---|---|---|---|---|
| C. keratinophilum | 28 | 143 | 52 | 36 | 64 |

Obviously, more than 60% of the hairs were decomposed.

Example 2
Decomposing Hairs in Agitated Tank

Figure 3:
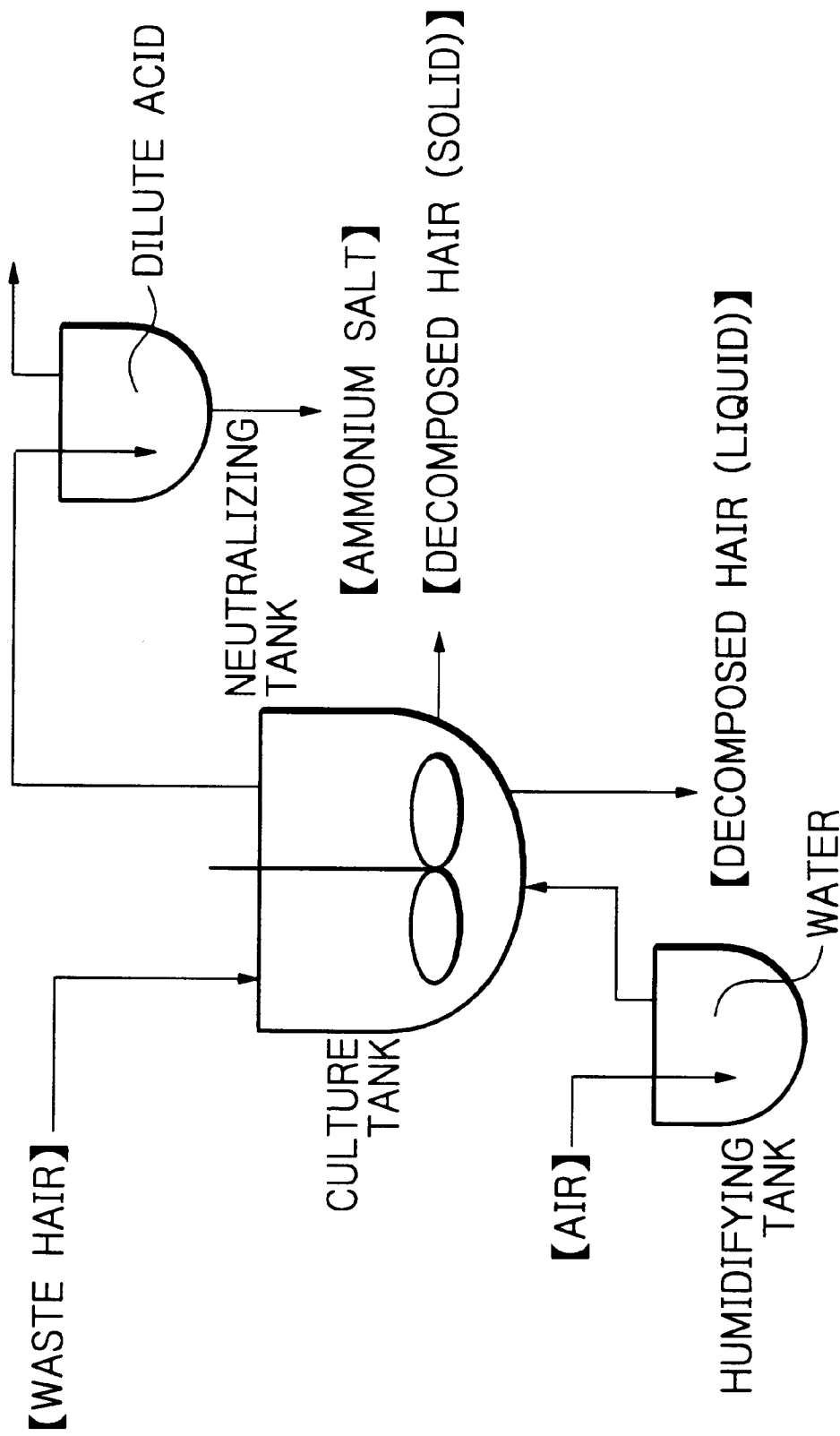
FIG. 3 is a schematic diagram of the process of decomposing hairs or feathers with a fungus in an agitated tank.

As FIG. 3 shows, hairs resulting from the hair saving unhairing process, Y medium and *Chrysosporium keratinophilum* were charged into an agitated tank and culture was effected under agitation. Humidified air was circulated during the culture but it may be replaced by circulation of dry air under occasional water spraying. After 20–30 days of culture, the hairs turned to an easily refinable state. The culture conditions were at 20–28° C. at a pH of 5–8.5 for 20–30 days.

Example 3
Decomposing Feathers

Figure 4:
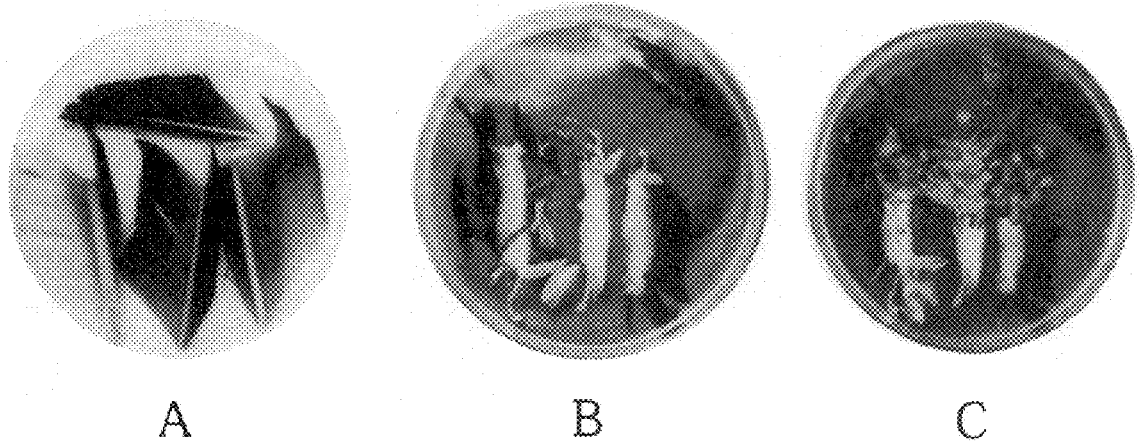
FIG. 4, which contains photographs A, B and C shows the progress of decomposition of feathers in the multi-stage packed column.

As in Example 1, a multi-stage packed column was charged with chick's feathers, Y medium and a seed liquor of *Chrysosporium keratinophilum* and culture was performed at 20–28° C. at a pH of 5–8.5 for 10 days. The fungus even grew on the shafts of feathers which were so efficiently decomposed that they could be readily refined (see FIG. 4). FIG. 4-A shows the untreated feathers; FIG. 4-B shows the feathers that were treated by culture of *Chrysosporium keratinophilum* for 10 days and it is clear that the fungus even proliferated on the shafts of feathers to enhance their decomposition; FIG. 4-C is the same as FIG. 4-B except that part of the treated feathers were refined with a spatula. As FIG. 4-C shows, the feathers treated by the method of the invention could be readily refined.

Example 4

The refined cattle hairs as obtained in Example 1 were sterilized by autoclaving and 6-g portions of them were each charged into two pots which also contained 2.3 L of garden soil. Two additional pots were each filled with 2.3 L of the same soil only and used as controls. The pots containing the refined cattle hairs and the control pots were each sown with Pakchoi; after germination, thinning was performed and three plants were grown in each pot. After 41 days of the cultivation, the plants including the roots were harvested and their weights were measured.

Figure 5:
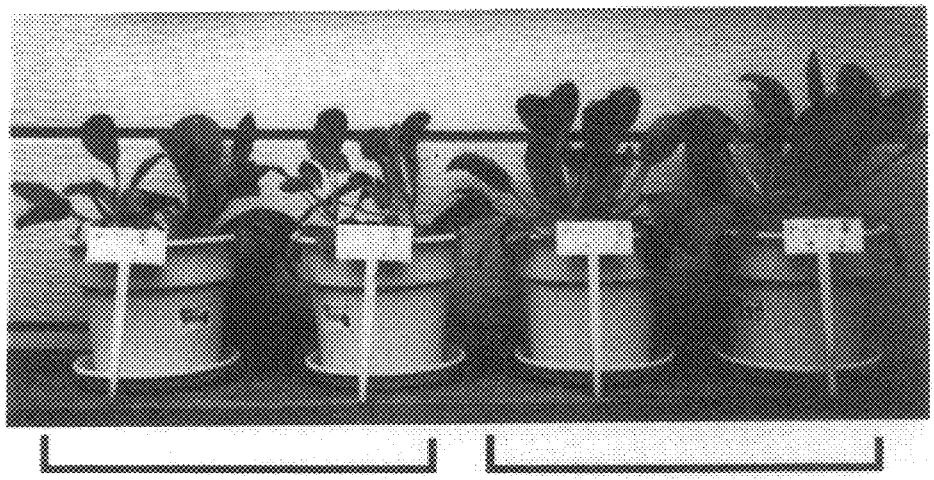
FIG. 5 is a photograph showing the growth of Pakchoi using the fertilizer of the invention as contrasted with controls.
Figure 6:
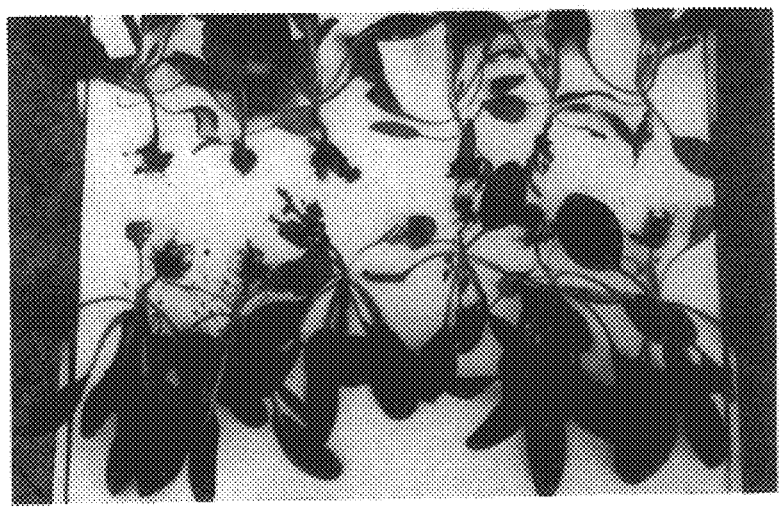
FIG. 6 is a photograph showing the growth of Pakchoi using the fertilizer of the invention as contrasted with a control.

The growths in the pots containing the refined cattle hairs were bigger than in the control pots (see FIGS. 5 and 6). The control growths weighed 7.9±3.9 g (mean±SD; n=6) whereas the growths in the pots containing the refined cattle hairs weighed 15.5±4.3 g (n=6); the difference was significant ($p<0.05$ in Student's t-test).

Example 5

The refined cattle hairs as obtained in Example 1 were sterilized by autoclaving and 25-g portions of them were each charged into two pots which also contained 2.3 L of garden soil. Two additional pots were each filled with 2.3 L of the same soil only and used as controls. The pots containing the refined cattle hairs and the control pots were each sown with red turnip; after germination, thinning was performed and three plants were grown in each pot. After 43 days of the cultivation, the plants including the roots were harvested and their weights were measured.

Figure 7:
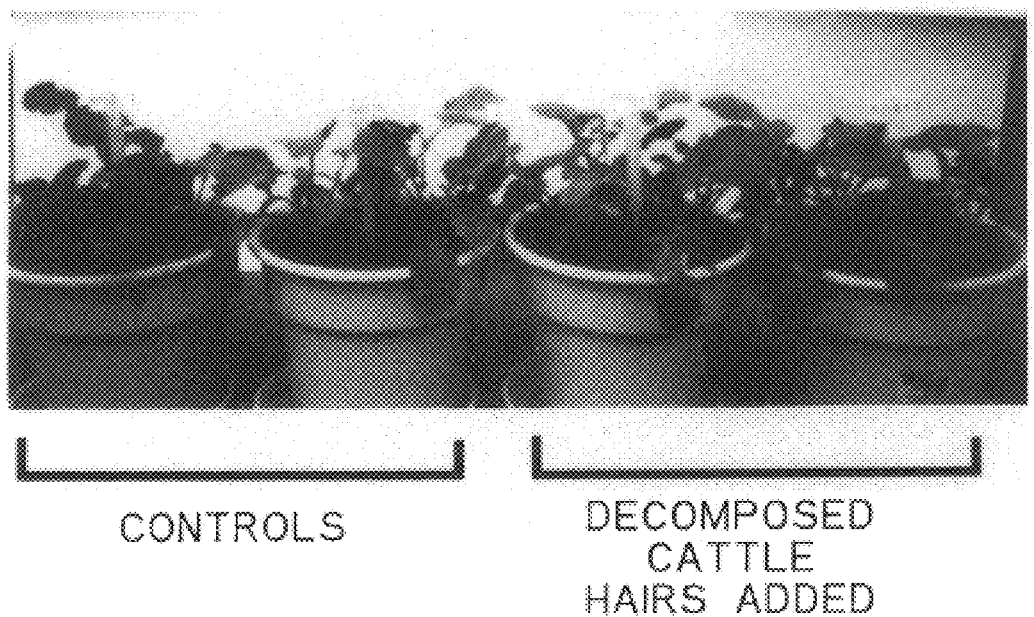
FIG. 7 is a photograph showing the growth of red turnip using the fertilizer of the invention as contrasted with controls.
Figure 8:
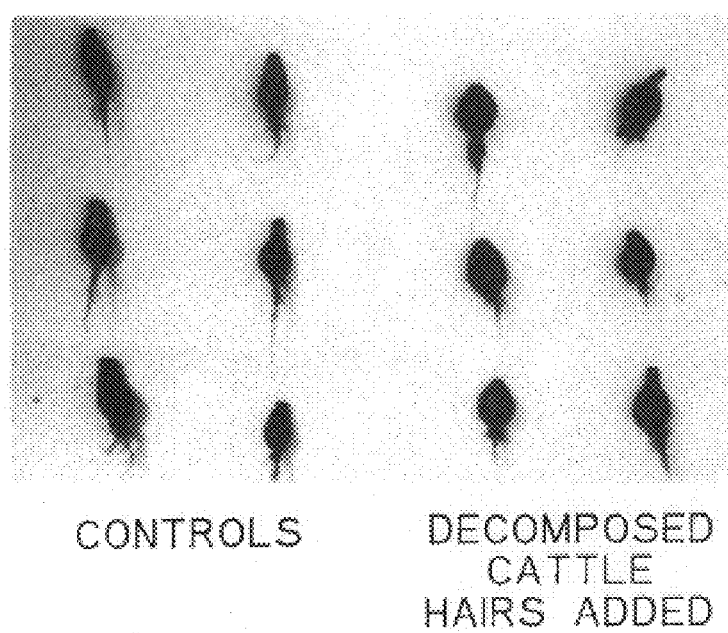
FIG. 8 is a photograph showing the growth of the roots of red turnip using the fertilizer of the invention as contrasted with controls.

The growths in the pots containing the refined cattle hairs were bigger than in the control pots (see FIGS. 7 and 8). The control growths weighed 3.5±0.8 g (mean±SD; n=6) whereas the growths in the pots containing the refined cattle hairs weighed 5.7±1.1 g (n=6); the difference was significant ($p<0.05$ in Student's t-test).

As is clear from the results of Examples 4 and 5, the hairs or feathers that have been refined by the method of the invention can promote the growth of plants significantly and hence are useful as a fertilizer.

The present invention provides a convenient and inexpensive method for decomposing and refining large quantities of hairs and feathers. The decomposed and refined hairs and feathers are advantageously used as a soil conditioner or a fertilizer. In addition, a liquor containing an ammonium salt derived from ammonia gas is useful as a nitrogenous fertilizer.

What is claimed is:

1. A process for preparing a powder of decomposed, refined hairs or feathers comprising:

decomposing hairs or feathers by treating said hairs or feathers in an oxygen-containing gas stream with *Chrysosporium keratinophilum* (FERM BP-7099);

converting the decomposed hairs or feathers into a powder; and recovering the powder.

2. The process of claim 1 wherein said oxygen-containing gas stream is humidified.

3. The process of claim 1 further comprising periodically spraying water into said oxygen-containing gas stream.

4. The process of claim 1 wherein said decomposing is carried out at 20–28° C. at a pH of 5–8.5 for a period of about 10–30 days.

5. The process of claim 1 comprising, prior to said decomposing, impregnating said hairs or feathers with a growth aid medium.

6. The process of claim 5 wherein said oxygen-containing gas stream is moisturized, and said decomposing is carried out at 20–28° C. at a pH of 5–8.5 for about 10–30 days.

* * * * *